(12) United States Patent
Saitwal et al.

(10) Patent No.: US 10,853,961 B1
(45) Date of Patent: *Dec. 1, 2020

(54) IMAGE DRIVER THAT SAMPLES HIGH-RESOLUTION IMAGE DATA

(71) Applicant: Intellective Ai, Inc., Dallas, TX (US)

(72) Inventors: Kishor Adinath Saitwal, Pearland, TX (US); Lon W. Risinger, Katy, TX (US); Wesley Kenneth Cobb, The Woodlands, TX (US); Ming-Jung Seow, Richmond, TX (US); Gang Xu, Houston, TX (US)

(73) Assignee: Intellective Ai, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/130,599

(22) Filed: Sep. 13, 2018

Related U.S. Application Data

(63) Continuation of application No. 14/952,090, filed on Nov. 25, 2015, now Pat. No. 10,102,642.

(51) Int. Cl.
| | |
|---|---|
| *G06K 9/62* | (2006.01) |
| *G06T 7/60* | (2017.01) |
| *G06K 9/00* | (2006.01) |
| *G06K 9/20* | (2006.01) |
| *G06K 9/46* | (2006.01) |
| *G06T 7/00* | (2017.01) |
| *G06K 9/52* | (2006.01) |
| *G06T 7/90* | (2017.01) |
| *H04N 5/33* | (2006.01) |

(52) U.S. Cl.
CPC ............ *G06T 7/60* (2013.01); *G06K 9/00744* (2013.01); *G06K 9/00771* (2013.01); *G06K 9/2054* (2013.01); *G06K 9/46* (2013.01); *G06K 9/4652* (2013.01); *G06K 9/52* (2013.01); *G06T 7/0002* (2013.01); *G06T 7/90* (2017.01); *H04N 5/33* (2013.01); *G06K 2009/4666* (2013.01); *G06T 2207/10016* (2013.01); *G06T 2207/10024* (2013.01); *G06T 2207/20081* (2013.01); *G06T 2207/20084* (2013.01); *G06T 2207/30232* (2013.01)

(58) Field of Classification Search
None
See application file for complete search history.

(56) References Cited

U.S. PATENT DOCUMENTS

| | | | | |
|---|---|---|---|---|
| 5,519,789 | A * | 5/1996 | Etoh | G06K 9/342 |
| | | | | 382/225 |
| 6,459,974 | B1 * | 10/2002 | Baloch | B60R 21/01538 |
| | | | | 701/45 |
| 9,098,908 | B2 * | 8/2015 | Kirk | G06T 7/593 |
| 9,697,599 | B2 * | 7/2017 | Prasad | A61B 5/1128 |

(Continued)

*Primary Examiner* — Iman K Kholdebarin

(57) ABSTRACT

Techniques are disclosed for generating a low-dimensional representation of an image. An image driver receives an image captured by a camera. The image includes features based on pixel values in the image, and each feature describes the image in one or more image regions. The image driver generates, for each of the plurality of features, a feature vector that includes values for that feature corresponding to at least one of the image regions. Each value indicates a degree that the feature is present in the image region. The image driver generates a sample vector from each of the feature vectors. The sample vector includes each of the values included in the generated feature vectors.

20 Claims, 8 Drawing Sheets

(56) References Cited

U.S. PATENT DOCUMENTS

| | | | |
|---|---|---|---|
| 2003/0099401 A1* | 5/2003 | Driggs | G10L 15/32 382/228 |
| 2004/0170323 A1* | 9/2004 | Cootes | G06K 9/6232 382/199 |
| 2005/0125368 A1* | 6/2005 | Akahori | G06K 9/342 706/12 |
| 2009/0208086 A1* | 8/2009 | Pelc | H04N 19/17 382/131 |
| 2010/0030780 A1* | 2/2010 | Eshghi | G06F 16/56 707/758 |
| 2010/0246969 A1* | 9/2010 | Winder | G06K 9/4671 382/195 |
| 2011/0015522 A1* | 1/2011 | Arditi | A61B 8/5223 600/431 |
| 2011/0040711 A1* | 2/2011 | Perronnin | G06K 9/6247 706/12 |
| 2012/0013501 A1* | 1/2012 | Ferretti | G06T 7/11 342/25 A |
| 2012/0106794 A1* | 5/2012 | Iwasaki | G06T 7/215 382/103 |
| 2014/0333775 A1* | 11/2014 | Naikal | G06K 9/00711 348/159 |
| 2016/0371833 A1* | 12/2016 | Prasad | G06K 9/00362 |
| 2017/0148183 A1* | 5/2017 | Saitwal | G06K 9/00744 |
| 2017/0286800 A1* | 10/2017 | Saitwal | G06K 9/66 |
| 2018/0150955 A1* | 5/2018 | Takeda | G06K 9/00228 |

\* cited by examiner

IMAGE DRIVER THAT SAMPLES HIGH-RESOLUTION IMAGE DATA

This application is a continuation of U.S. patent application Ser. No. 14/952,090, filed Nov. 25, 2015; the entirety of the aforementioned application is herein expressly incorporated by reference for all purposes.

FIELD

Embodiments of the present disclosure generally relate to techniques for analyzing digital images. More specifically, embodiments presented herein provide techniques for extracting a robust set of features from a high-resolution image in order to generate a low-dimensional sample of the image for analysis.

BACKGROUND

Image analytics generally refers to approaches that programmatically evaluate a stream of images for a variety of applications.

SUMMARY

An image analytics system, such as for video surveillance, industrial control systems, and the like, may be configured to detect a set of pre-defined patterns in a successive stream of images. The pre-defined patterns may be hard-coded into the image analytics system (or the system may train itself based on provided definitions or rules). The image analytics system identifies abnormalities in the image sequences based on the pre-defined rules and alerts an administrator of the abnormalities. For example, in an industrial setting, an image analytics system may evaluate frames of a thermographic camera for changes in color, shape, or gradients that deviate from explicitly defined patterns.

However, many image analytics systems require a significant amount of computing resources to process raw image data. For example, evaluating sequences of high-resolution images may consume substantial processor power, storage, and bandwidth. Given the cost of the resources, such systems are difficult to scale. Further, such an approach may be rigid for some image analytics systems. For example, in video surveillance, a camera may be fixed on a given scene. Analytics may be unable to detect unpredictable behavior occurring in that scene, particularly if the behavior is undefined. That is, unless a given behavior conforms to a pre-defined rule, an occurrence of the behavior can go undetected by the system. Even if the system trains itself to identify changes in image characteristics, the system requires rules to be defined in advance for what to identify.

One embodiment of the disclosure includes a computer-implemented method for generating a low-dimensional representation of an image. The method generally includes receiving an image captured by a camera. The image includes a plurality of features based on pixel values in the image. Further, each feature describes the image in one or more image regions. The method also includes generating, for each of the plurality of features, a feature vector that includes values for that feature corresponding to at least one of the image regions. Each value indicates a degree that the feature is present in the image region. A sample vector is generated from each of the feature vectors. The sample vector includes each of the values included in the generated feature vectors.

Other embodiments include, without limitation, a non-transitory computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features, advantages, and objects of the present disclosure are attained and can be understood in detail, a more particular description of the disclosure, briefly summarized above, may be had by reference to the embodiments illustrated in the appended drawings.

It is to be noted, however, that the appended drawings illustrate only typical embodiments of the present disclosure and are therefore not to be considered limiting of its scope, for the present disclosure may admit to other equally effective embodiments.

DETAILED DESCRIPTION

Figure 1:
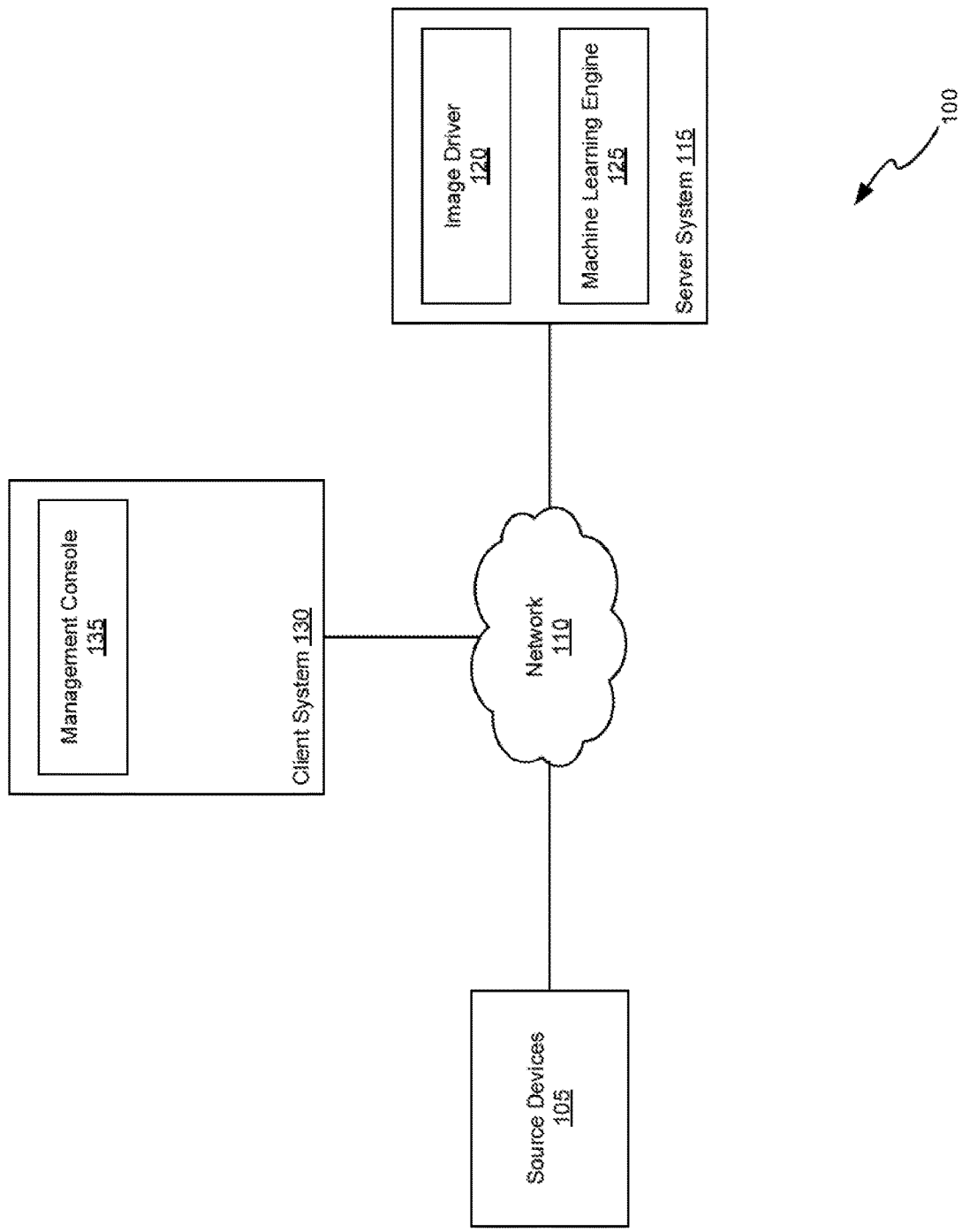
FIG. 1 illustrates an example computing environment, according to one embodiment.

Embodiments presented herein disclose techniques for generating low-dimensional samples of high-resolution images. The low-dimensional samples may be analyzed by a behavioral recognition system. In one embodiment, a behavioral recognition system is configured to analyze and learn patterns of behavior based on streams of data collected from a number of image sensors, such as visible cameras, infrared cameras, video surveillance cameras, etc. Each sensor may capture a stream of high-resolution images and transmit the image data to the behavioral recognition system.

In one embodiment, the behavioral recognition system includes an image driver configured to generate low-dimensional samples from the high-resolution image data. To do so, the image driver instantiates a processing pipeline for each sensor. At a given pipeline, the image driver receives raw image data from the corresponding sensor. The image driver extracts a set of robust feature values (also referred to herein as "descriptors") from the image. Example features include homogeneity, gradient values, color, shape, motion activity, entropy, etc. Further, the image driver may extract a given feature in different regions of the image. For example, for a given feature, such as entropy, the image driver may divide the image into four rectangular regions and determine an entropy feature values for each region (e.g., from a 0 to 1 value indicating the degree of entropy within the region), resulting in a feature vector with four entropy values. As another example, for another feature, such as homogeneity, the image driver may evaluate the image as an entire region, resulting in a feature vector having one value.

In one embodiment, the image driver may generate a sample vector from the feature vectors, e.g., by concatenating each feature vector with one another. A sample vector is formatted such that machine learning components within the behavioral recognition system may understand which values correspond to which features and regions. In effect, the sample vector represents a low-dimensional representation of the raw image data. That is, the image driver reduces an input image that may comprise millions of pixels to a low-dimensional sample vector describing various features of that input image evaluated in different regions.

In one embodiment, the image driver may send the sample vector to a sensory memory component in the behavioral recognition system. The sensory memory may generally provide a message bus for the system. The machine learning components can then retrieve multiple sample vectors (representing a low-dimensional sequence of images) from the sensory memory and analyze the sample vectors to create learning models and detect behavioral patterns of such models, without the need for pre-defined patterns of activity. Doing so allows the machine learning components to distinguish between normal occurrences within the image and abnormal occurrences, such as unexpected changes in any of the extracted features observed over time. Further, the machine learning components may generate alerts in response to observed instances of abnormal behavior in the images.

For example, assume that the behavioral recognition system is deployed in an industrial setting, e.g., a chemical plant. Sensors, such as infrared cameras, capture and send streams of high-resolution image frames to the behavioral recognition system at a relatively low data rate. For instance, a given sensor may capture real-time images of fluids passing through a chemical pipeline and mixing with other fluids. The behavioral recognition system may construct a learning model from the sample vectors generated from the image driver. Machine learning components can detect unexpected changes in the observed data, such as sudden and extreme changes in color and gradient features in one or more image regions (e.g., which in actuality could represent a potential hazard occurring within the chemical pipeline). The behavioral recognition system may generate an alert that includes relevant data (e.g., frames where the change is observed, etc.) for an administrator to evaluate.

Generally, the regions evaluated by the image driver for a given feature may be pre-configured (e.g., by a manufacturer of the behavioral recognition system). However, an administrator may configure the image driver to focus on a given region or regions more granularly. For example, assume that by default the image driver evaluates a given feature in four regions in an image. Also assume that the administrator would like the image driver to evaluate the lower-right quadrant more closely. In one embodiment, an administrator may configure spatial granularity for the image driver using a profile. In particular, a profile for a given sensor may specify settings for how granular image driver should evaluate an image in extracting a given feature. For example, the administrator may specify some range between 0 and 1 for a given feature, where 1 indicates a highest degree of spatial granularity. The profile may also allow the administrator to choose sections of the image for the image driver to evaluate more granularly (for instance, a custom region in the image). In the example, the administrator may create a profile for evaluating the lower-right quadrant at a higher spatial granularity. The image driver receives the profile settings and automatically adjusts specified region based on specifications in the profile.

Further, the profile may also specify a temporal granularity, i.e., rate at which the image driver generates sample vectors for a given image stream. In addition, the image driver may be configured to send a sample to sensory memory at a given interval, e.g., one sample vector every five seconds, etc. In some cases, an administrator may want to identify some occurrence happening within a shorter time frame (where the current time frame is inadequate to capture such occurrence). The image driver can adjust the sample rate based on the temporal granularity specifications in the profile.

Advantageously, embodiments disclosed herein generate samples of input image data in real time. The image driver extracts feature values (e.g., color foreground, contrast, etc.) from an input image and produces a sample vector from the extracted feature values, effectively creating a low-dimensional approximation of a high resolution image. For instance, an image having a pixel dimension of 640×480 may be represented as a sample vector having forty-eight feature values. As a result, the machine learning components can analyze the image relatively efficiently. Further, the sample vectors allow a behavioral recognition system to evaluate a given series of image frames holistically, learning expected patterns and characteristics for the series of frames and detecting abnormalities therein.

Note, the following uses a behavioral recognition system that adaptively learns patterns of activity from image input data as an example of a system that receives low-dimensional samples generated from raw image data. However, one of skill in the art will recognize that embodiments disclosed herein are adaptable to a variety of systems that receive image input for different types of analysis (e.g., detecting patterns, monitoring characteristics within a given image, etc.).

FIG. 1 illustrates a computing environment 100, according to one embodiment. As shown, computing environment 100 includes source devices 105, a network 110, a server system 115, and a client system 130. The network 110 may transmit streams of image data captured by one or more source devices 105 (e.g., visible cameras, infrared cameras, video surveillance cameras, etc.). Of course, the source devices 105 may be connected to the server system 115 directly (e.g., via USB or other form of connecting cable). Network 110 receives raw image data from the source devices 105 in real-time. In addition to a live feed provided by the source device 105, the server system 115 could also receive a stream of images from other input sources (e.g., VCR, DVR, DVD, computer, web-cam device, and the like).

For example, the source devices 105 may be one or more visible and/or infrared cameras situated various locations in a chemical plant. For example, source devices 105 may be situated in the chemical plant to observe the flow of various liquids along one or more chemical pipelines. Each infrared camera may provide streaming feed (i.e., a continuous sequence of images, or frames) analyzed independently by the server system 115. The source devices 105 may be configured to capture image data as frames at a specified frame-rate. Further, the image data may be encoded using known formats, e.g., JPEG, PNG, GIF, and the like.

In one embodiment, the server system 115 includes an image driver 120 and a machine learning engine 125. In one embodiment, the server system 115 represents a behavioral recognition system. As further described below, the image driver 120 generates samples of image data sent from the source devices 105. To do so, the image driver 120 extracts robust feature data from each image frame. In particular, the image driver 120 identifies features based on pixel values included in the image.

Examples of feature data include color foreground, entropy of gradients, magnitude of gradients, intensity entropy, homogeneity, energy, contrast, Gray-Level Co-Occurrence Matrix (GLCM) mean, GLCM variance, correlation, cluster shade, cluster prominence, gradient location and orientation histogram, motion activity, Euler's Number, projections, eccentricity, elongatedness, rectangularity, direction, compactness, and moments. Of course, the image driver may be configured to extract data corresponding to other known features.

For each input image, the image driver 120 generates feature vectors that include normalized values (e.g., falling within a range of 0 to 1) with respect to each feature. Doing so allows each feature to be modeled as a statistical distribution between 0 and 1. The image driver 120 may concatenate each feature vectors as a sample vector. The sample vector is formatted such that it is readable by the machine learning engine 125.

In one embodiment, the machine learning engine 125 evaluates, observes, learns, and remembers details regarding events (and types of events) occurring within the sequence of images. When observations deviate from learned behavior (based on some learning model), the machine learning engine 125 may generate an alert (e.g., to a management console 135 executing on the client system 130). In one embodiment, the machine learning engine 125 performs neural-network-based linguistic analysis of the resulting sample vectors generated by the image driver 120.

The machine learning engine 125 generates a learning model by organizing the sample vectors into clusters. Further, the neuro-linguistic module may assign a symbol, e.g., letters, to each cluster which reaches some measure of statistical significance. From the letters, the neuro-linguistic module builds a dictionary of observed combinations of symbols, i.e., words based on a statistical distribution of symbols identified in the input data. Specifically, the neuro-linguistic module may identify patterns of symbols in the input data at different frequencies of occurrence, up to a maximum word size (e.g., 5 letters).

The most frequently observed words (e.g., 20) provide a dictionary of words corresponding to the stream of images. Using words from the dictionary, the neuro-linguistic module generates phrases based on probabilistic relationships of each word occurring in sequence relative to other words, up to a maximum phrase length. For example, the neuro-linguistic module may identify a relationship between a given three-letter word that frequently appears in sequence with a given four-letter word, and so on. The syntax allows the machine learning engine 125 to learn, identify, and recognize patterns of behavior without the aid or guidance of predefined activities.

Thus, unlike a rules-based system, which relies on pre-defined patterns to identify or search for in an image stream, the machine learning engine 125 learns patterns by generalizing input and building memories of what is observed. Over time, the machine learning engine 125 uses these memories to distinguish between normal and anomalous behavior reflected in observed data.

Figure 2:
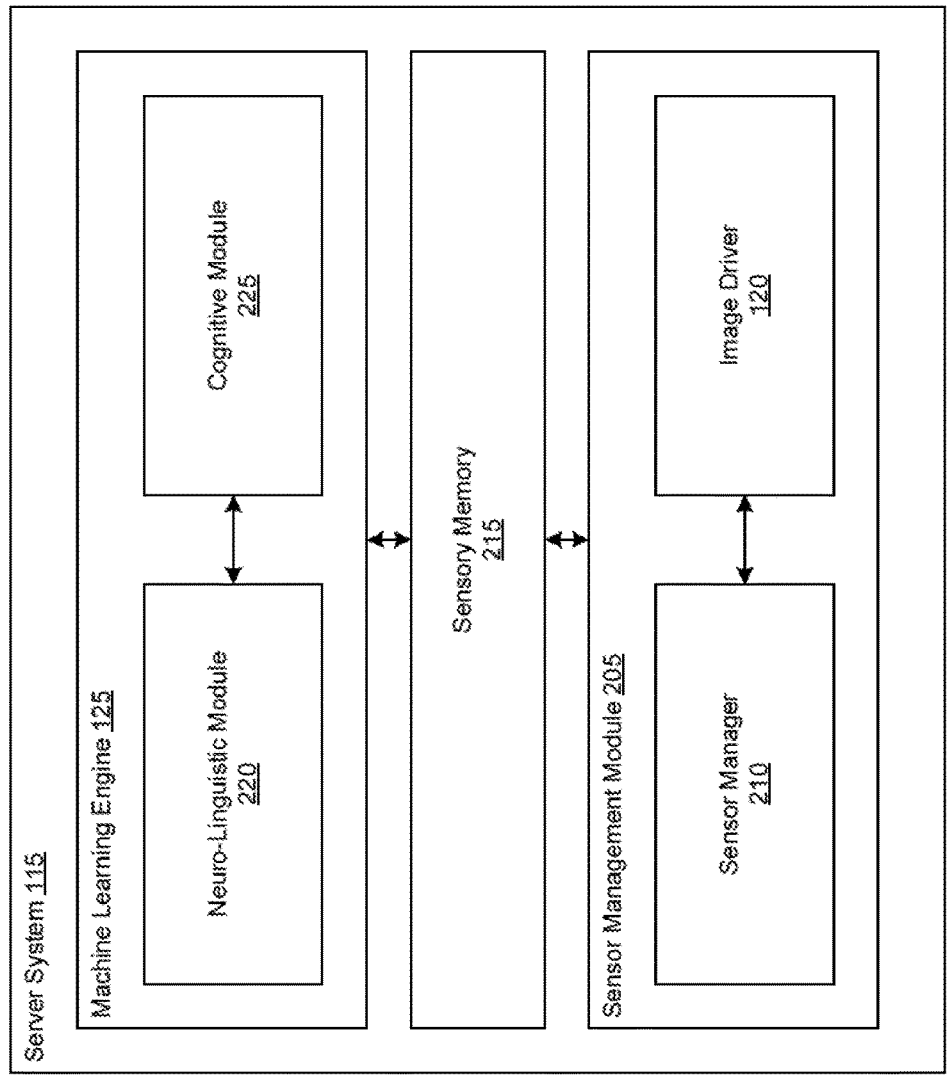
FIG. 2 further illustrates components of the server computing system shown in FIG. 1, according to one embodiment.

FIG. 2 further illustrates the server system 115, according to one embodiment. As shown, the server system 115 further includes a sensor management module 205 and a sensory memory 215, In addition, the machine learning engine 125 further includes a neuro-linguistic module 220 and a cognitive module 225. And the sensor management module 205 further includes a sensor manager 210 and the image driver 120.

In one embodiment, the sensor manager 210 enables or disables source devices 105 to be monitored by the image driver 120 (e.g., in response to a request sent by the management console 135). For example, if the management console 135 requests the server system 115 to monitor activity at a given location, the sensor manager 210 determines the source device 105 configured at that location and enables that source device 105.

In one embodiment, the sensory memory 215 is a data store that transfers large volumes of data from the image driver 120 to the machine learning engine 125. The sensory memory 215 stores the data as records. Each record may include an identifier, a timestamp, and a data payload. Further, the sensory memory 215 aggregates incoming data in a time-sorted fashion. Storing incoming data from the image driver 120 in a single location allows the machine learning engine 125 to process the data efficiently. Further, the server system 115 may reference data stored in the sensory memory 215 in generating alerts for anomalous activity. In one embodiment, the sensory memory 215 may be implemented in via a virtual memory file system. In another embodiment, the sensory memory 215 is implemented using a key-value share.

In one embodiment, the neuro-linguistic module 220 performs neural network-based linguistic analysis of normalized input data to describe activity observed in the data. As stated, rather than describing the activity based on pre-defined objects and actions, the neuro-linguistic module 220 develops a custom language based on symbols, e.g., letters, generated from the input data. The cognitive module 225 learns patterns based on observations and performs learning analysis on linguistic content developed by the neuro-linguistic module 220.

Figure 3:
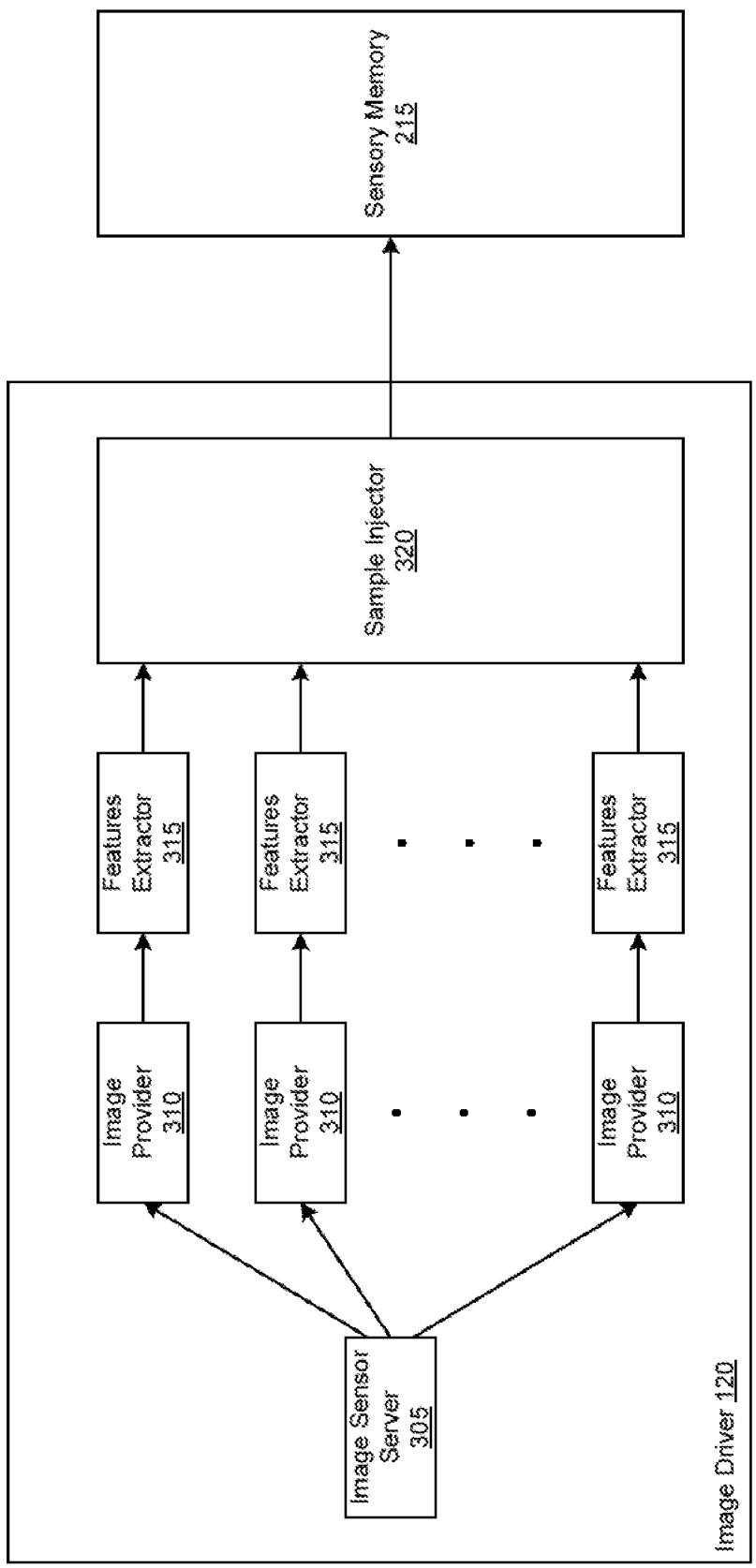
FIG. 3 further illustrates the image driver shown in FIG. 1, according to one embodiment.

FIG. 3 further illustrates the image driver 120, according to one embodiment. As shown, the image driver 120 includes an image sensor server 305, one or more image providers 310, one or more features extractors 315, and a sample injector 320.

In one embodiment, the image sensor server 305 initializes sensor instances (source devices 105) based on specifications of the sensor manager 210. Each instance provides a pipeline represented by an image provider 310 and features extractor 315 outputting feature vectors into the sample injector 320. As further described, the image provider 310 connects with a corresponding source device 105 and feeds raw image frames to the features extractor 315.

For a given image, the features extractor 315 evaluates robust features of the image. Each feature describes a given aspect of the image frame, such as color, entropy, homogeneity, etc. For a given feature, the features extractor 315 may evaluate a specified amount of regions of the image and determine an individual feature value for each region. The value indicates a degree at which the feature is present in the image, e.g., falling within a range of 0 to 1, inclusive. The features extractor 315 generates a vector associated with each extracted feature, where the vector includes a feature value for each region.

In one embodiment, the features extractor 315 generates a sample vector for the image. In one embodiment, the sample vector is a concatenation of each feature vector associated with the image. The features extractor 315 sends the sample vector to the sample injector 320. In turn, the sample injector 320 packages the sample vector with information such as the associated source device 105, an identifier for the image, a timestamp, etc. Further, the sample injector 320 formats the packaged sample vector such that the machine learning engine 125 may evaluate the values in the sample.

Thereafter, the sample injector 320 sends the packaged and formatted sample vector to the sensory memory 215. The sample injector 320 may be configured to send image samples to the sensory memory 215 at a specified rate, e.g., once every five seconds, once every ten seconds, etc. As stated, the sensory memory 215 serves as a message bus for the image driver 120 and the machine learning engine 125. The machine learning engine 125 may retrieve the sample vectors as needed.

Figure 4:
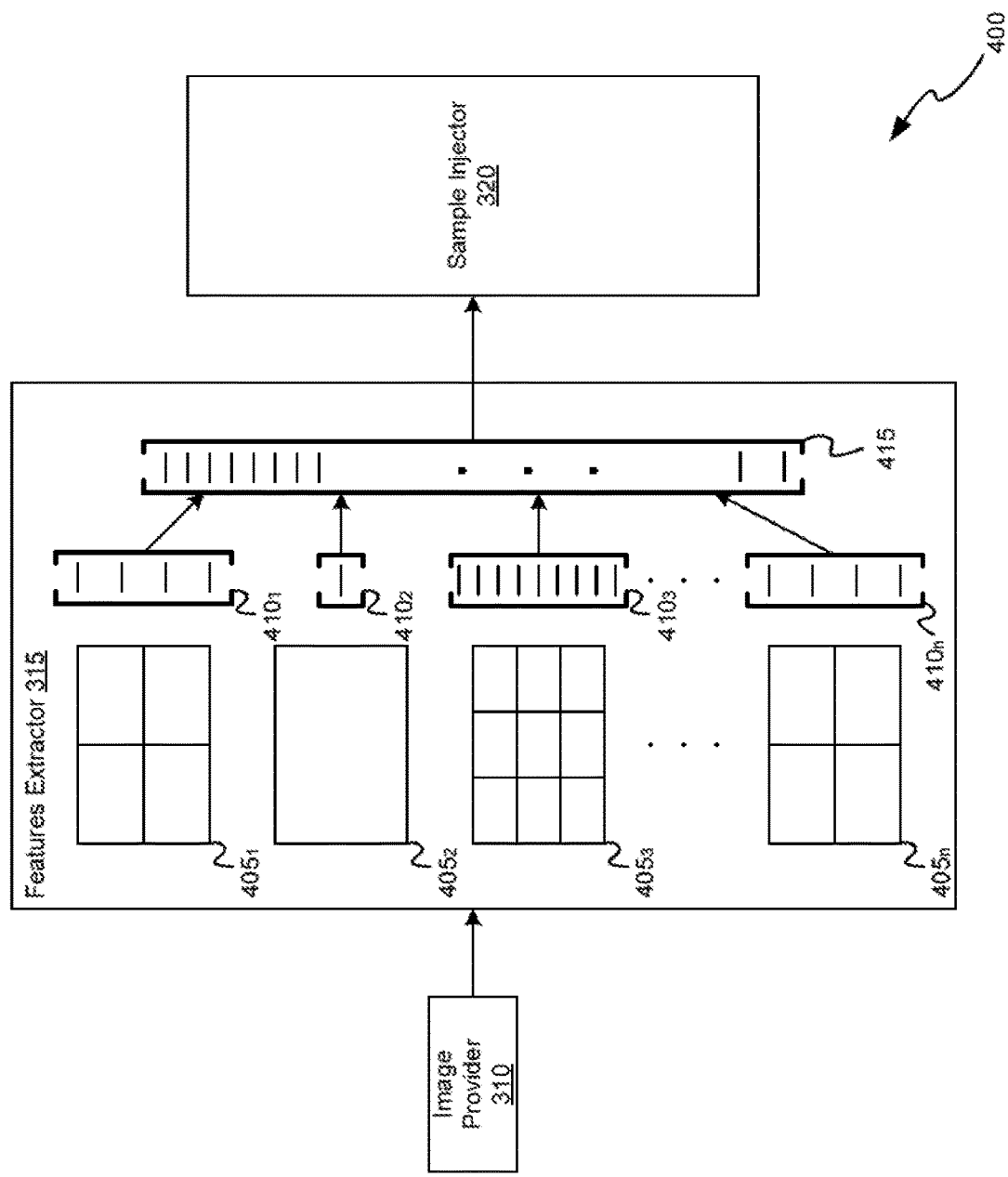
FIG. 4 illustrates an example image driver pipeline, according to one embodiment.

FIG. 4 illustrates an example image driver pipeline 400 processing a current image sent by a given source device 105, according to one embodiment. As stated, the image sensor server 305 may initialize a pipeline per sensor (i.e., source device 105) that includes an image provider 310, a features extractor 315, and the sample injector 320. In this example, assume that the pipeline 400 processes image data captured by an infrared camera, e.g., situated in a chemical plant. Of course, the pipeline 400 may process image data from other types of source devices, such as a video surveillance camera capturing a given scene.

The image provider 310 feeds a current image to the features extractor 315. Illustratively, the features extractor may evaluate the image for various features, where each individual feature $405_{1-n}$ is evaluated separately. For many features, such as color and motion activity, it is desirable that different regions of the image are evaluated separately. For example, in a given image, motion activity may be more prominent in one region than in another.

Thus, for a given feature, the features extractor 315 may divide the image into different regions and evaluate each region relative to the feature. In this example, the features extractor 315 extracts values for feature $405_1$ in four regions, for feature 4052 in one region, for feature 4053 in nine regions, and feature $405n$ in four regions. As a result, the feature extractor 315 extracts a feature value from each of the four regions in feature $405_1$, and so on.

Figure 5:
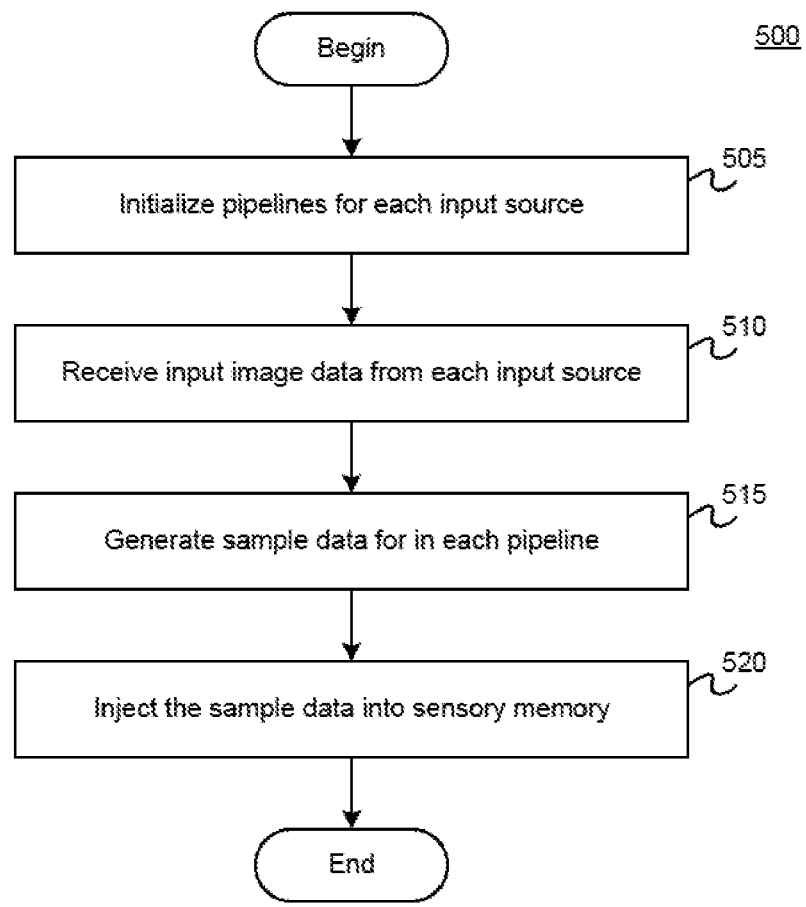
FIG. 5 illustrates a method for processing raw image data for analysis by machine learning components, according to one embodiment.

For each feature $405_{1-n}$, the features extractor 315 places each value in a respective feature vector $410_{1-n}$. Further, the features extractor 315 concatenates each of the feature vectors $410_{1-n}$ to create a sample vector 415. The sample vector 415 is a low-dimensional representation of the image, where each feature is represented by one or more values (per evaluated region) falling within a range of 0 to 1, inclusive. The feature extractor 315 then sends the sample vector 415 to the sample injector 320, FIG. 5 illustrates a method 500 for processing image data for analysis by the machine learning engine, according to one embodiment. As shown, method 500 begins at step 505, the image sensor server 305 initializes an image feed pipeline for each source device 105 enabled to send input to the server system 115. Each pipeline is configured to process each image (e.g., frame) captured by the corresponding source device 105. As stated, the pipeline includes an image provider 310 and a features extractor 315 that send sample data to the sample injector 320.

At step 510, each image provider 310 receives input image data from an associated source device 105. That is, the image provider 310 receives a sequence of frames from the source device 105. The image provider 310 feeds each frame to the features extractor 315, which in turn extracts robust features (e.g., color, gradient information, homogeneity, entropy, etc.) from each incoming frame. At step 515, the image driver 120 generates a sample vector for each input image in each pipeline. The sample vector includes each of the extracted features. Steps 510 and 515 are described in further detail relative to FIG. 6.

The features extractor 315 sends a sample vector for each individual image to the sample injector 320. At step 520, the sample injector 320 sends the sample vectors into sensory memory 215. The sample injector 320 packages each sample vector individually with information such as identifier and timestamp data.

Figure 6:
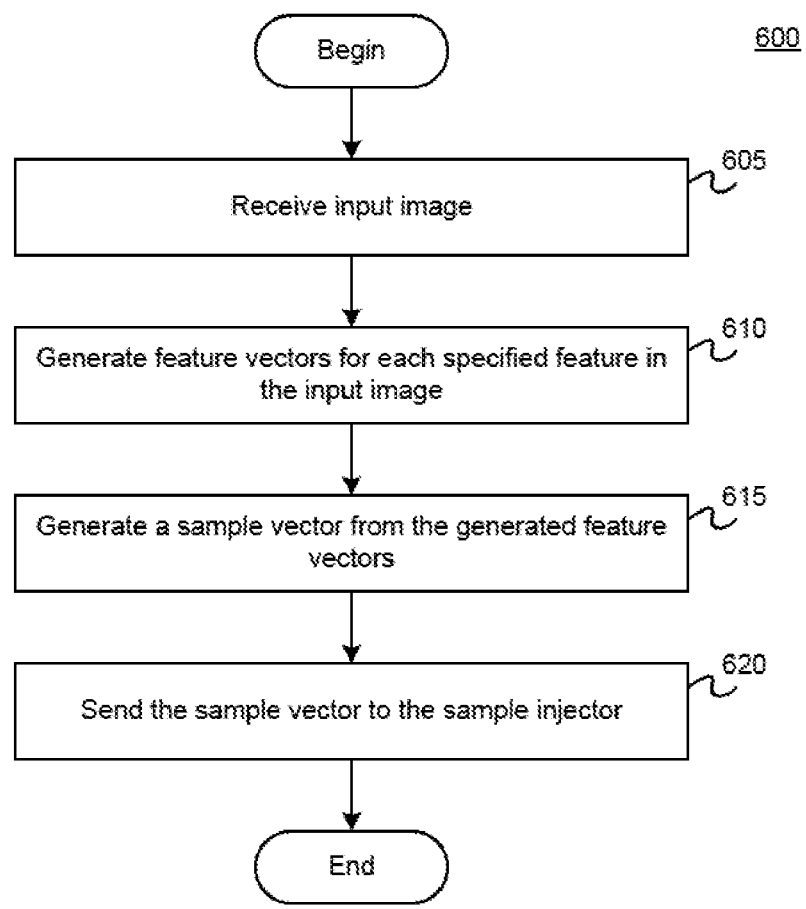
FIG. 6 illustrates a method for generating a sample vector of feature values extracted from raw image data, according to one embodiment.

FIG. 6 illustrates a method 600 for generating a sample vector of feature values extracted from raw image data, according to one embodiment. In particular, method 600 describes the process from the perspective of a given features extractor in an image driver pipeline when processing an individual image. As shown, method 600 begins at step 605, where the features extractor 315 receives an input image from the image provider 310. The image may be a frame captured by a source device 105 associated with the image provider 310, such as an infrared camera.

At step 610, the features extractor 315 generates feature vectors for each feature in the image. To do so, the features extractor 315 may, for each specified feature, extract feature values in one or more regions individually. For example, the features extractor 315 may evaluate four regions for a given feature. The resulting feature vector will include four values. Each feature may be evaluated in a different amount of regions from another.

At step 615, the features extractor 315 generates a sample vector from the generated feature vectors. For instance, to do so, the features extractor 315 may concatenate each of the generated feature vectors together to create one sample vector. The sample vector is a low-dimensional representation of the input image that includes all of the feature information of the image, encoded with numeric values corresponding to the feature information.

At step 620, the features extractor 315 sends the sample vector to the sample injector 320. In turn, the sample injector 320 packages the sample vector with additional data (e.g., source device identifier, sample identifier, timestamp, etc.). The sample injector 320 then sends the packaged sample vector to sensory memory 215.

Figure 7:
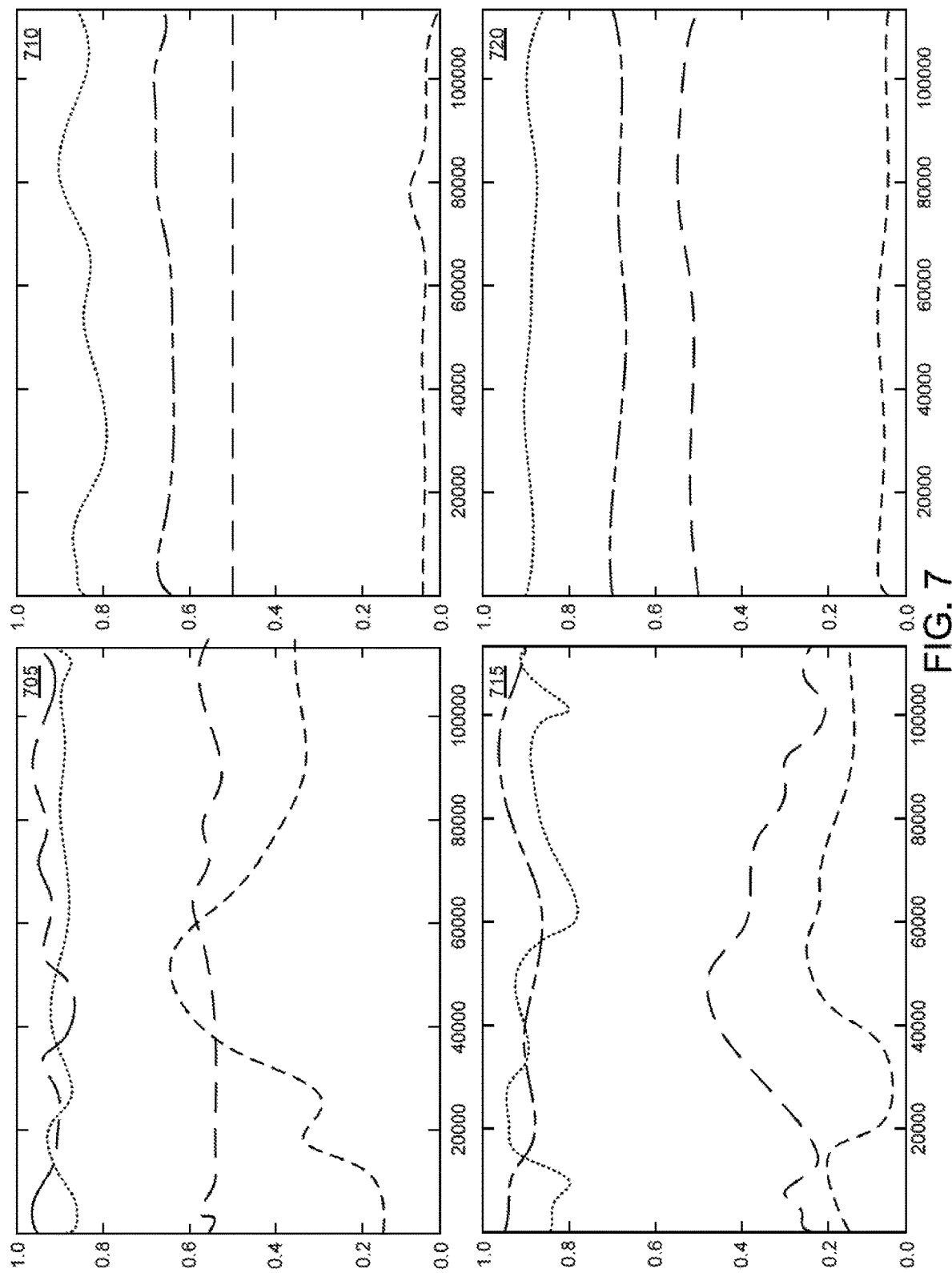
FIG. 7 illustrates a graphical representation of features extracted for different regions of raw image data over a number of frames, according to one embodiment.

FIG. 7 illustrates a graphical representation of features extracted for different regions of image data over a number of frames, according to one embodiment. In particular, FIG. 7 depicts plots of feature values for four different features in four regions (represented as graphs 705, 710, 715, and 720) of a given image. Graph 705 represents an upper-left region of the image, graph 710 represents an upper-right region of the image, graph 715 represents a lower-left region of the image, and graph 720 represents a lower-right region of the image. The x-axis of each region graph 705, 710, 715, and 720 represents a number of frames, and the y-axis represents feature value (from 0 to 1.0).

These example graphs 705, 710, 715, and 720 may represent, e.g., a two-hour video having a number of frames that is processed through the image driver 120. The plots on the graph represent feature values as recorded at each given frame. Jumps in the values can be ascertained in some regions, e.g., in graph 705. In other regions, such as the region depicted in graph 720, the feature values remain relatively consistent across successive frames. The machine learning engine 125 continuously learns patterns from the observed values and detects abnormalities in subsequently observed patterns.

In the event that the machine learning engine 125 detects an abnormality, the server system 115 may generate alert media, e.g., a video clip of the raw image frames falling within the range of the reported alert time, any of the graphs 705, 710, 715, and 720, etc. For the graphs, the machine learning engine 125 may assign colors to each feature as well as highlight corresponding values triggering such an alert. The machine learning engine 125 may send the alert media to the management console 135, e.g., for review by an administrator.

Figure 8:
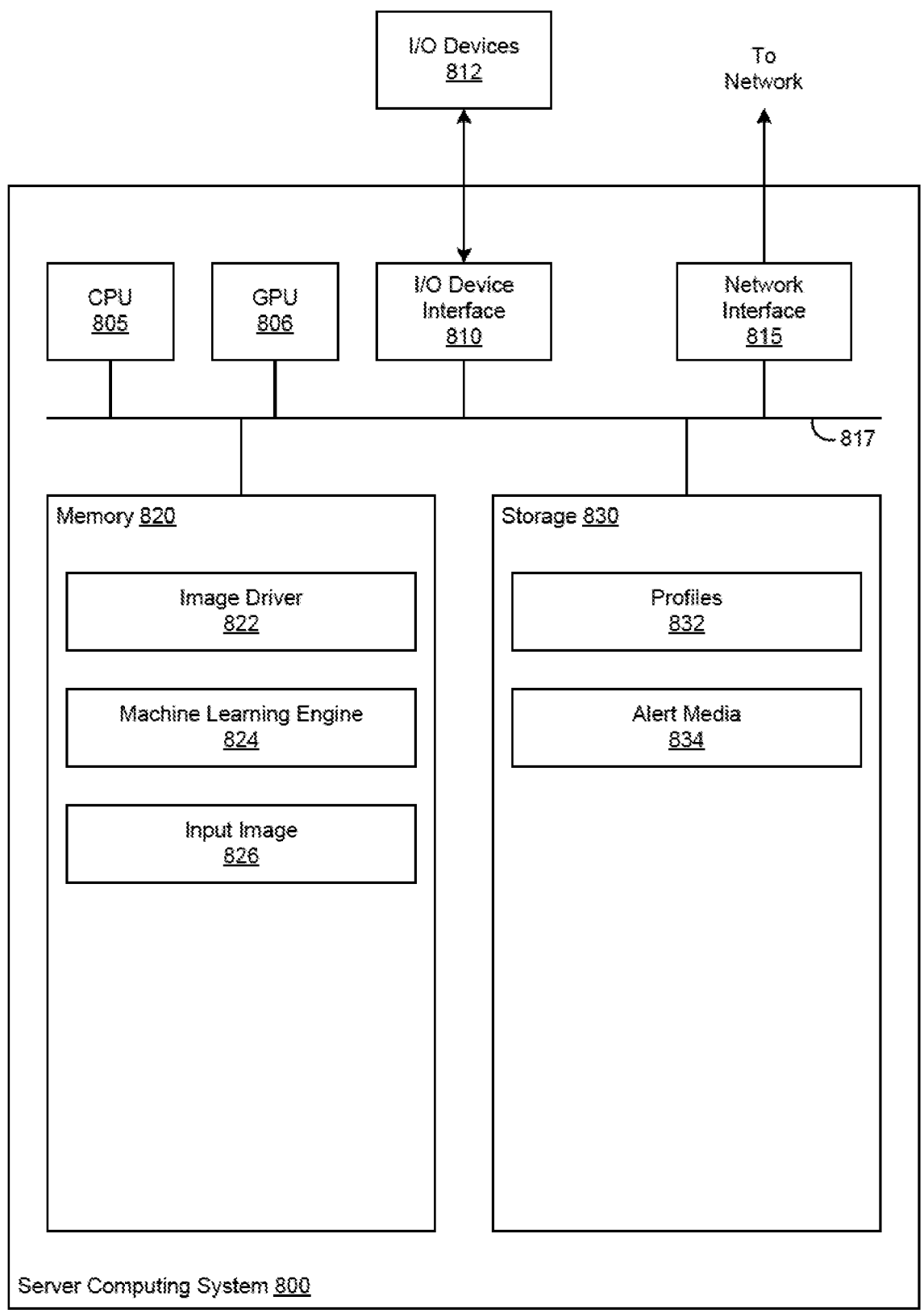
FIG. 8 illustrates a server computing system configured to process raw image data for analysis by machine learning components, according to one embodiment.

FIG. 8 illustrates an example computing system 800, according to one embodiment. As shown, the computing system 800 includes, without limitation, a central processing unit (CPU) 805, a graphics processing unit (GPU) 806, a network interface 815, a memory 820, and storage 830, each connected to a bus 817. The computing system 800 may also include an I/O device interface 810 connecting I/O devices 812 (e.g., keyboard, display and mouse devices) to the computing system 800.

Further, in context of this disclosure, the computing elements shown in computing system 800 may correspond to a physical computing system (e.g., a system in a data center) or may be a virtual computing instance executing within a computing cloud. In one embodiment, the computing system 800 is representative of a behavioral recognition system.

The CPU 805 retrieves and executes programming instructions stored in memory 820 as well as stores and retrieves application data residing in the memory 830. The interconnect 817 is used to transmit programming instructions and application data between the CPU 805, I/O devices interface 810, storage 830, network interface 815, and memory 820.

Note, CPU 805 is included to be representative of a single CPU, multiple CPUs, a single CPU having multiple processing cores, and the like. And the memory 820 is generally included to be representative of a random access memory. The storage 830 may be a disk drive storage device. Although shown as a single unit, the storage 830 may be a combination of fixed and/or removable storage devices, such as fixed disc drives, removable memory cards, optical storage, network attached storage (NAS), or a storage area-network (SAN).

In one embodiment, the GPU 806 is a specialized integrated circuit designed to accelerate the image output in a frame buffer intended for output to a display. GPUs are very efficient at manipulating computer graphics and are generally more effective than general-purpose CPUs for algorithms where processing of large blocks of data is done in parallel.

In one embodiment, the memory 820 includes an image driver 822, a machine learning engine 824, and an input image 826. And the storage 830 includes one or more profiles 832 and alert media 834. As discussed above, the image driver 822 generates samples of image data (e.g., input image 826) sent from source devices, such as video surveillance cameras, visible cameras, infrared cameras, etc. The image driver 822 extracts robust features from the input image 826 and generates feature vectors corresponding to each feature to be evaluated.

The image driver 822 generates the sample vector from the feature vectors of the input image 826 (e.g., by concatenating the feature vectors of the image) and sends the sample vector to a sensory memory for retrieval by the machine learning engine 824. The machine learning engine 824 performs neuro-linguistic analysis on the sample vectors and learns patterns from the values provided in the vectors. The machine learning engine 824 distinguishes between normal and abnormal patterns of activity and generates alerts (e.g., alert media 834) based on observed abnormal activity.

In one embodiment, the profiles 832 specify spatial and temporal granularity settings for feature region evaluation and sample rate. An administrator may configure a spatial granularity for a given feature, e.g., using a numerical value from 0 to 1, inclusive. As a result, the image driver 822 automatically configures the number of regions to evaluate to accomplish such spatial granularity. In addition, the administrator may configure a temporal granularity in a profile to adjust the rate that the image driver 822 sends samples to the machine learning engine 824. In response to changes in spatial and/or temporal granularity in a profile 832, the machine learning engine 824 adjusts receiving parameters to understand the resulting sample vectors sent by the image driver 822.

In the preceding, reference is made to embodiments of the present disclosure. However, the present disclosure is not limited to specific described embodiments. Instead, any combination of the following features and elements, whether related to different embodiments or not, is contemplated to implement and practice the techniques presented herein.

Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects presented herein may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures.

For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments presented herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Users can access any of the computing resources that reside in the cloud at any time, from anywhere across the Internet. For example, in context of this disclosure, a virtual server instance in a computing cloud could be configured to execute the image driver to process a streaming camera feed (or feeds). In such case, the computing resources could be scaled as needed as multiple camera feeds are added.

While the foregoing is directed to embodiments of the present disclosure, other and further embodiments may be devised without departing from the basic scope thereof, and the scope thereof is determined by the claims that follow.

What is claimed is:

1. A computer-implemented method, comprising:
    generating, for each of a plurality of features of a first image in a sequence of images, a feature vector associated with a region of the first image and indicative of a degree to which that feature is present in the region of the first image;
    generating a first sample vector based on the feature vectors, the first sample vector including values from each of the feature vectors; and
    evaluating the first sample vector relative to at least a second sample vector associated with at least one further image in the sequence of images.

2. The computer-implemented method of claim 1, wherein the sequence of images includes images captured by at least one of an infrared camera or a visible camera.

3. The computer-implemented method of claim 1, further comprising sending the first sample vector to a sample memory for retrieval by a machine learning engine that evaluates the first sample vector.

4. The computer-implemented method of claim 1, wherein the values from each of the feature vectors include at least one of: a color feature, an entropy feature, a homogeneity feature, or a gradient feature.

5. The computer-implemented method of claim 1, further comprising:
    receiving, at a first time, a profile specifying a spatial granularity for at least one feature from the plurality of features of the first image; and
    receiving, at a second time after the first time, the first image.

6. The computer-implemented method of claim 1, further comprising:
    receiving a profile specifying a spatial granularity for at least one feature from the plurality of features of the first image; and
    adjusting a non-zero number of regions of the first image based on the spatial granularity.

7. A non-transitory computer-readable medium storing instructions to cause a processor to:
    generate, for each of a plurality of features of a first image in a sequence of images, a feature vector associated with a region of the first image and indicative of a degree to which that feature is present in the region of the first image;
    generate a first sample vector based on the feature vectors, the first sample vector including values from each of the feature vectors; and
    evaluate the first sample vector relative to at least a second sample vector associated with at least one further image in the sequence of images.

8. The computer-readable medium of claim 7, wherein the sequence of images includes images captured by at least one of an infrared camera or a visible camera.

9. The computer-readable medium of claim 7, further storing instructions to cause the processor to send the first sample vector to a sample memory for retrieval by a machine learning engine that evaluates the first sample vector.

10. The computer-readable medium of claim 7, wherein the values from each of the feature vectors include at least one of: a color feature, an entropy feature, a homogeneity feature, or a gradient feature.

11. The computer-readable medium of claim 7, further storing instructions to cause the processor to:
    receive, at a first time, a profile specifying a spatial granularity for at least one feature from the plurality of features of the first image; and
    receive, at a second time after the first time, the first image.

12. The computer-readable medium of claim 7, further storing instructions to cause the processor to:
    receive a profile specifying a spatial granularity for at least one feature from the plurality of features of the first image; and
    adjust a number of regions of the first image based on the spatial granularity.

13. A computer-implemented method, comprising:
    receiving a sequence of images, each image from the sequence of images including a plurality of features and each feature from the plurality of features being descriptive of at least one region of that image;
    generating a sample vector based on a set of feature vectors associated with the plurality of features of a first image from the sequence of images, the sample vector including values from each feature vector from the set of feature vectors; and evaluating the sample vector relative to at least one further sample vector associated with at least one further image in the sequence of images.

14. The method of claim 13, wherein the sequence of images includes images captured by at least one of an infrared camera or a visible camera.

15. The method of claim 13, further comprising sending the first sample vector to a sample memory for retrieval by a machine learning engine that evaluates the sample vector.

16. The method of claim 15, wherein the machine learning engine evaluates the sample vector using neuro-linguistic analysis.

17. The method of claim 13, wherein the values from each of the feature vectors include at least one of: a color feature, an entropy feature, a homogeneity feature, or a gradient feature.

18. The method of claim 13, further comprising:
receiving, at a first time, a profile specifying a spatial granularity for at least one feature from the plurality of features of the first image; and
receiving, at a second time after the first time, the first image.

19. The method of claim 13, further comprising:
receiving a profile specifying a spatial granularity for at least one feature from the plurality of features of the first image; and
adjusting a non-zero number of regions of the first image based on the spatial granularity.

20. The method of claim 13, further comprising receiving the first image.

* * * * *